United States Patent Office 3,814,826
Patented June 4, 1974

3,814,826
PROCESS FOR IMPROVING THE AROMA RETENTION OF FREEZE-DRIED COFFEE PRODUCTS
Timothy Andrew Lubsen, Springfield Township, Cincinnati, Jayantilal Mohanbhai Patel, Cincinnati, and Robert Aurand Cody, Wyoming, Ohio, assignors to The Procter & Gamble Company, Cincinnati, Ohio
No Drawing. Filed May 17, 1972, Ser. No. 254,011
Int. Cl. A23f 1/04
U.S. Cl. 426—388                    9 Claims

ABSTRACT OF THE DISCLOSURE

A process for improving the aroma retention, aroma character, and appearance of freeze-dried coffee particles comprises uniformly wetting the surface of freeze-dried coffee particles with steam by passing the particles through a jet of steam or by some other suitable means. The steam is added to the coffee in a ratio of about 0.1 to about 1.5.

BACKGROUND OF THE INVENTION

A well known method for improving the quality of instant coffee is to isolate coffee aroma and add it to instant coffee particles. Such a product will have an improved coffee aroma which is more like the aroma found in roast and ground coffee. Many attempts to improve instant coffee products in this manner have been made. One such attempt is described in commonly assigned copending application Ser. No. 189,746, filed Oct. 15, 1971, Aroma Enriched Coffee Products and Process by Lubsen, Strobel, Reinhart and Patel.

The quality of freeze-dried instant coffee products can also be improved by using the above-described technique. However, upon aging the initial ground coffee aroma of freeze-dried products declines rapidly in intensity. The character of the aroma also tends to shift to a non-ground coffee aroma character.

Accordingly, it is an object of this invention to improve the initial aroma intensity of freeze-dried instant coffee and the aroma retention of freeze-dried instant coffee products in regard to both the intensity of the aroma and the roast and ground character of the aroma. Other objects of this invention will become apparent from the following description of the invention.

SUMMARY OF THE INVENTION

The process of the present invention improves the initial aroma intensity, the aroma retention, and the appearance of freeze-dried coffee products. The process comprises uniformly wetting the surface of freeze-dried coffee particles with steam by passing a loose, non-compact stream of freeze-dried coffee particles through a jet of steam. The steam is added to the coffee in a ratio of from about 0.1 to about 1.5, preferably about 0.3 to about 1.0. Other methods of uniformly wetting the coffee particles can also be used in accordance with the present invention. The important factor is that the surface of the freeze-dried particles must become glazed. One such method utilizes a finely atomized jet of superheated water to wet the freeze-dried coffee particles in the same manner as with steam. After being wetted and glazed, the coffee particles are dried to a moisture content of about 3% to obtain the maximum protection against staling of the product. Preferably the particles are allowed to fall on a conveyor belt which carries them to a warm air dryer.

DETAILED DESCRIPTION OF THE INVENTION

The process of the present invention is primarily applicable to freeze-dried coffee particles. However, it can be used with certain types of spray-dried coffee particles to achieve a similar effect. It is very important to this process that the freeze-dried coffee particles be contacted with steam while the particles are in a loose, non-compact stream. This prevents the freeze-dried coffee particles from agglomerating to a significant extent.

The steam to coffee weight ratio must be at least 0.1 or the particles will not be sufficiently wetted to provide the desired increase in aroma intensity and aroma retention. The upper limit of 1.5 on the steam to coffee ratio is a practical upper limit. More than one pass through the steam jet can be used. The advantageous effects of this process increase as more moisture is applied to the particles. The range of 0.3 to 1.0 is preferred because very good results are achieved without the need for extensive drying. If a range of 0.1 to 0.5 is used, the product does not have to be dried after the wetting takes place. This is advantageous because further drying could damage the flavor of the product.

It is very important to note that what appears to be taking place in this process is a surface phenomenon. It is theorized that the initial wetting softens and plasticizes the surfaces of the particles without penetrating very deeply into the interior of the particles. The initial wetting occurs while the particles are within the steam jet, a period lasting only a fraction of a second. After they leave the steam jet, the particles equilibrate and most of the moisture penetrates the interior of the particles. The surfaces of the particles are left in a glazed condition. They are dry enough to be handled easily and much drier than they were during wetting, but they still contain much more moisture than before the wetting step. This glazing effect seems to destroy the outer portion of the particles' pore structure, thus cutting off access to the inner reaches of the particle.

The following theory is offered to explain the increased initial aroma intensity and the increased aroma retention which is provided by the process of the present invention. When aromatization is to be accomplished using a coffee oil aroma carrier, the success of the process depends upon the availability of the aroma. It is important that the aroma diffuse out of the oil into the headspace of the container, such as a jar, to establish an equilibrium. When aroma-enriched coffee oil is added to, or injected into, a jar of untreated freeze-dried coffee particles, a significant fraction of the oil is immediately absorbed deep into the interior of the particles with which it comes into contact. It seems that the oil penetrates so deeply into the particles that a substantial portion of the aroma contained therein never comes out into the headspace of the jar, and thus the initial aromatized state is less desirable. The aroma which does come out then diffuses into the very small pores of the particles (the vast majority) which have not come in contact with the coffee oil. Again, the aroma penetrates very deeply into these particles and becomes entrapped therein. Thus, the aroma decay is comparatively fast so that when the final or aged aromatized state is reached, the aroma level is unacceptable.

It appears that glazing the surfaces of the particles seals off the pores and reduces both the absorption of aroma-enriched coffee oil carrier and the infiltration of the coffee aroma volatiles into the freeze-dried particles. Thus, the aroma-enriched coffee oil stays close to the surface where the aroma contained therein is available to go into the headspace of the jar. The aroma which escapes from the oil carrier is absorbed less extensively into the particles and thus is available as sensible aroma in the headspace of the jar. Thus, the initial aroma intensity and the aroma retention are much greater.

It appears that freeze-dried coffee has a background aroma. This background aroma is not compatible with ground coffee aroma. It is theorized that glazing the surface of freeze-dried coffee particles prevents the evolution of the freeze-dried background aroma, thus improving the ground coffee character of the aroma in the headspace of the jar.

Whatever the mechanism, the combination of this process with the addition of roast and ground coffee aroma to the freeze-dried coffee particles provides higher initial aroma intensity at the same carrier level and improved aroma retention. The preferred process for the addition of roast and ground coffee aroma to the coffee particles is described in the above-mentioned copending and commonly assigned application Ser. No. 189,746.

To briefly generalize, it has been found that coffee particles having highly porous structures are not compatible with the aroma-enriched carrier. Products which are structurally compatible with the aroma-enriched character can broadly be described as those of a relatively non-porous structure. As was stated above, the glazed freeze-dried particles are relatively non-porous because the pore structure of the outer surface is destroyed. When non-porous products are combined with the aroma-enriched carrier, the aroma-enriched carrier is deposited on the product surface and a minimum of sorption occurs. Thus an equilibrium is established between the liquid phase, i.e. the aroma-enriched carrier and the volatilized aroma compounds within the available container space. When the product container is opened the volatilized aroma escapes and is sensed by the olfactory nerves to provide an intense coffee aroma. On the other hand, when the container is closed because the equilibrium between the liquid phase aroma-enriched carrier and its vapor has been shifted, more aroma volatilizes from its freely available position on the structurally compatible product to again fill the vessel with volatilized aroma. Importantly, because of this structural compatibility the aroma is freely available for sensing upon successive container openings, i.e. is retained, and does not change in character because of contaminating materials which have been sorbed and act to degrade the aroma character.

Examples of structurally non-compatible products which are therefore unsuitable for use herein unless treated to make them less porous include light-colored freezee-dried coffees and most spray-dried non-agglomerated instant coffees. The process of the present invention renders these products much more compatible with roast and ground coffee aroma than any prior art process.

Structural compatibility as defined herein can be conveniently measured by a method called mercury porosimetry. For precise details of this method see an article by Frevel et al., "Modifications in Mercury Porosimetry," *Analytical Chemistry*, vol. 35, No. 10, September 1963, pp. 1492–1502, which is incorporated by reference herein. Briefly, the method comprises forcing mercury under pressure by means of a penetrometer into the voids of the particle surface and knowing the initial weight of the particles and the amount of mercury weight added by filling voids a specific density number referred to herein as pore factor can be determined. More specifically, the Mercury Porosimetry technique measures specific density variations with changes in pressure. Basically, the technique involves forcing mercury into a glass bulb of known volume and containing a known weight of particles by varying the pressure of the system. As the pressure increases, the mercury fills the void spaces in between particles. Once these void spaces are filled, increases in pressure will force mercury into any particle surface pores present. Further increases in pressure will cause the mercury to penetrate the smaller, more inaccessible pores which open onto the particle surface. When all pores have been penetrated, further increases in pressure will not force any more mercury into the bulb and specific density will remain constant. For non-porous substances, once the void spaces between particles are filled, further increases in pressure will result in a constant specific density.

Application of the above-described technique to the specifics of the present invention is accomplished by first evacuating the penetrometer containing the desired particles to a pressure of less than 0.5 millimeters of mercury, placing the mercury contained in a surrounding evacuated vessel into contact with the penetrometer, and thereafter gradually increasing the pressure and taking incremental readings from the calibrated penetrometer which are then plotted against pressure. The pore factor is the reading of the specific denstiy obtained from the plotted curve at an absolute pressure of 550 millimeters of mercury pressure. This pressure is chosen because at this pressure one can measure the specific density of all types of coffee regardless of structure or particle size. The pore factor is the measure of the amount of internal voids in the coffee particle.

Comparison of the pore factors before and after the glazing treatment proves that the structure of the freeze-dried coffee particles has been changed. The pore factor of light-colored freeze-dried coffee particles is normally from 0.6 to 0.7. After the glazing treatment the same freeze-dried coffee particles have a pore factor of at least about 0.8 and more normally about 0.9. Thus it can be seen that the structure of these freeze-dried coffee particles has been changed. Steamed freeze-dried products with a pore factor of at least about 0.8 are sufficiently compatible with roast and ground coffee aroma to have the ability to retain desirable aroma without aroma character degradation, i.e. changing to a non-coffee-like aroma.

Specifically, the product will have an aroma retention factor of not less than 0.80. The retention factor is defined herein as the fraction of initial aroma intensity retained after two months aging in a sealed jar. As explained later, this is measured in terms of gas chromatograph counts, explained below, versus the time in a sealed jar. Products which have been processed according to the present invention and to which coffee aroma has been added have a retention factor of 0.80 or greater, which means that after two months of aging in a sealed jar the product aroma intensity is at least 80% of what the initial intensity was, and its character remains essentially unchanged. The initial aroma intensity is measured one or two hours after the carrier is injected into the jar because it takes that long to reach the initial aromatized state.

In accord with gas chromatograph aroma measurement analysis, the following standard procedure is employed. A sealed, two-ounce size jar of the coffee product to be tested is obtained. A syringe is inserted through the seal and a 10 cubic centimeter sample of the gaseous constituents in the jar headspace is withdrawn. The 10 cc. gaseous sample is then placed into a conventional gas chromatograph wherein the sample is separated into its various aroma components. The components are separated and indicated on a graph showing various aromatic component peaks. The more aromatic constituents the more peaks are present in the graph. In addition, the greater the total area under the peaks the more intense the product aroma. Since the number of peaks as well as their height are an indication of aroma intensity, determining the area under the peaks by well known integration methods provides an accurate measurement of aroma intensity. This integrated figure is referred to herein as "counts." This is conveniently obtained by utilization of an electronic integrator. Utilizing the above technique, very definite standard aroma intensities for roast and ground coffee and instant coffee products can be determined.

Additional advantages of the process of the present invention are: (1) The process produces a unique appearance not obtainable from freeze drying alone in that the final product has a low level of fines; (2) the process permits dark final colors with low density at freeze drying conditions which otherwise would produce a light-colored and low density product; and (3) the process provides the capability of increasing the bulk density of freeze-dried products because the outer surfaces of the particles collapse slightly.

The following examples are meant only to illustrate the present invention and not to limit it in any way.

EXAMPLE I

Freeze dried coffee particles containing 2.1% moisture were run through a steam agglomerator in two passes. The steam to coffee ratio was 0.5 in each pass, making the overall ratio about 1. The particles were allowed to fall vertically in a very loose, non-compact stream so as to prevent agglomeration from occurring. A horizontally directed steam jet was used to apply steam to the particles.

The moisture content of the particles after the first pass was 4.7% and after the second pass it was 7.5%. One-half of the particles were then dried in a fluidized bed warm air dryer at 170° F. to a moisture content of 3.7%. All of the particles were then placed in jars, aromatized according to the process described in the abovementioned copending application, Ser. No. 189,746, and sealed in the jars. The initial aroma intensity in counts was measured one hour after sealing according to the method described above. The results are shown in Table 1. The aromatization efficiency is a measure of the number of counts of aroma present in the jar per 0.1% of coffee oil carrier added.

TABLE 1

| Material | Grams coffee/ jar | Percent added oil added/ jar | Pore factor | Initial counts | Aromatization efficiency (counts/ 0.1% oil) |
|---|---|---|---|---|---|
| Freeze-dried feed | 57 | 0.407 | 0.67 | 261 | 64 |
| Steamed | 72 | 0.320 | 0.92 | 337 | 105 |
| Steamed and dried | 72 | 0.320 | 0.84 | 292 | 91 |

From the results shown in Table 1, it can be seen that the pore factor of the freeze-dried product has been substantially increased by steaming. The aromatization efficiency has been increased by 50% in the steamed and dried product. Thus, the increase in initial intensity is shown.

All three materials were aged for two months at 70° F. The aroma measurements were then made again and the results are shown in Table 2.

TABLE 2

| Material | Initial counts | Counts after aging | Retention factor |
|---|---|---|---|
| Freeze-dried feed | 261 | 168 | 0.64 |
| Steamed | 337 | 309 | 0.92 |
| Steamed and dried | 292 | 261 | 0.89 |

These results show a substantial increase (about 50%) in aroma retention when the steaming process is used. If superheated water is used in place of steam, similar results are achieved. If spray dried coffee is used, the initial aroma intensity and the aroma retention are also improved.

EXAMPLE II

The procedure of Example I was repeated except that only one pass was used. A freeze-dried coffee feed containing 2.4% moisture was steamed at a steam to coffee ratio of 0.45 to obtain a glazed product containing 4.9% moisture. It was not necessary to dry the product. It was aromatized and tested as in Example I. The pore factor was in the range of 0.75 to 0.82. The initial aroma intensity was 300 counts and after one month the intensity was 250 counts, an aroma retention factor of 0.84.

What is claimed is:

1. A process for improving the aroma retention of freeze-dried coffee particles, which comprises contacting porous freeze-dried coffee particles with steam, said steam being added to a loose, non-compact stream of the coffee particles in a weight ratio of from about 0.1 to about 1.5, thereby to uniformly wet the surfaces of the freeze-dried particles in a matter which prevents significant agglomeration.

2. The process of claim 1 wherein the ratio of steam to coffee is about 0.3 to about 1.0.

3. The process of claim 1 wherein the coffee particles are wetted by passing said particles through a steam jet.

4. The process of claim 3 wherein roast and ground coffee aroma is added to the wetted freeze-dried coffee particles.

5. A process for improving the aroma retention of freeze-dried coffee particles, which comprises contacting a loose, non-compact stream of porous freeze-dried coffee particles with a finely atomized jet of superheated water, wherein the weight ratio of water added to the coffee is from about 0.1 to about 1.5, thereby to uniformly wet the surfaces of the free-dried particles in a manner which prevents significant agglomeration.

6. The process of claim 5 wherein the ratio of water added to the coffee is about 0.3 to about 1.0.

7. The process of claim 5 wherein roast and ground coffee aroma is added to the wetted freeze-dried coffee particles.

8. A process for improving the aroma retention of spray-dried coffee particles, which comprises contacting porous spray-dried coffee particles with steam, said steam being added to a loose, non-compact stream of the coffee particles in a ratio of from about 0.1 to about 1.5, thereby to uniformly wet the surfaces of the freeze-dried particles in a manner which prevents significant agglomeration.

9. A process for improving the aroma retention of spray-dried coffee particles, which comprises contacting a loose, non-compact stream of porous spray-dried coffee particles with a finely atomized jet of superheated water, wherein the weight ratio of water added to the coffee is from about 0.1 to about 1.5, thereby to uniformly wet the surfaces of the freeze-dried particles in a manner which prevents significant agglomeration.

References Cited

UNITED STATES PATENTS 3,652,293  3/1972  Lombana et al. _____ 99—71
2,947,634  8/1960  Feldman et al. _____ 99—71

FRANK W. LUTTER, Primary Examiner

W. L. MENTLIK, Assistant Examiner

U.S. Cl. X.R.

426—455

PO-1050
(5/69)

UNITED STATES PATENT OFFICE
CERTIFICATE OF CORRECTION

Patent No. 3,814,826           Dated    June 4, 1974

Inventor(s) Timothy Andrew Lubsen, Jayantilal Mohanbhai Patel, and Robert Aurand Cody It is certified that error appears in the above-identified patent and that said Letters Patent are hereby corrected as shown below:

Column 3, line 44, "freezee-dried" should be -- freeze-dried --

Column 6, line 15, "matter" should be -- manner --

Column 6, line 30, "free-dried" should be -- freeze-dried --

Signed and sealed this 8th day of October 1974.

(SEAL)
Attest:

McCOY M. GIBSON JR.                C. MARSHALL DANN
Attesting Officer                  Commissioner of Patents